(12) United States Patent
Vladislav et al.

(10) Patent No.: US 8,527,448 B2
(45) Date of Patent: Sep. 3, 2013

(54) SYSTEM, METHOD AND APPARATUS FOR INCREASING SPEED OF HIERARCHIAL LATENT DIRICHLET ALLOCATION MODEL

(71) Applicant: Huawei Technologies Co., Ltd., Guangdong (CN)

(72) Inventors: Kopylov Vladislav, Shenzhen (CN); Liufei Wen, Shenzhen (CN); Guangyu Shi, Santa Clara, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/722,078

(22) Filed: Dec. 20, 2012

(65) Prior Publication Data

US 2013/0159236 A1 Jun. 20, 2013

Related U.S. Application Data

(63) Continuation of application No. PCT/CN2012/075842, filed on May 22, 2012.

(30) Foreign Application Priority Data

Dec. 16, 2011 (CN) .......................... 2011 1 0424177

(51) Int. Cl.
*G06F 9/44* (2006.01)
*G06N 7/02* (2006.01)
*G06N 7/06* (2006.01)
*G06F 15/18* (2006.01)
*G06F 7/00* (2006.01)
*G06F 17/30* (2006.01)

(52) U.S. Cl.
USPC ................. 706/52; 706/12; 706/14; 707/706; 707/737

(58) Field of Classification Search
None
See application file for complete search history.

(56) References Cited

U.S. PATENT DOCUMENTS

| 2009/0228238 A1* | 9/2009 | Mansinghka et al. | ........ 702/181 |
| 2012/0095952 A1* | 4/2012 | Archambeau et al. | .......... 706/52 |
| 2012/0203752 A1* | 8/2012 | Ha-Thuc et al. | .............. 707/706 |

FOREIGN PATENT DOCUMENTS

| CN | 1507596 A | 6/2004 |
| CN | 101359333 A | 2/2009 |

(Continued)

OTHER PUBLICATIONS

F. Doshi-Velez, D. Knowles, S.Mohamed, and Z. Ghahramani. Large scale nonparametric Bayesian inference: Data parallelisation in the Indian buffet process. In Advances in Neural Information Processing Systems 22, 2010.*

(Continued)

*Primary Examiner* — Kakali Chaki
*Assistant Examiner* — Daniel Pellett

(57) ABSTRACT

Embodiments of the present invention disclose a data processing method including: sending global initial statistical information to each slave node; merging received local statistical information of each slave node, to obtain new global statistical information; if Gibbs sampling performed by a slave node has ended, calculating a probability distribution between a document and topic and a probability distribution between the topic and a word according to the new global statistical information; according to the probability distributions obtained through calculation, establishing a likelihood function of a text set, and maximizing the likelihood function, to obtain a new hLDA hyper-parameter; and if iteration of solving for an hLDA hyper-parameter has converged, and according to the new hLDA hyper-parameter, calculating and outputting the probability distribution between the document and topic and the probability distribution between the topic and word.

17 Claims, 9 Drawing Sheets

(56) References Cited

FOREIGN PATENT DOCUMENTS

| CN | 101986298 A | 3/2011 |
|---|---|---|
| CN | 102243625 A | 11/2011 |
| EP | 1 374 094 | 9/2002 |

OTHER PUBLICATIONS

Williamson, S., Wang, C., Heller, K., and Blei, D. The IBP compound dirichlet process and its application to focused topic modeling. In Proceedings of ICML, 2010.*

Sinead Williamson, Chong Wang, Katherine Heller, and David Blei. Focused topic models. In NIPS workshop on Applications for Topic Models: Text and Beyond, Whistler, Canada., 2009.*

Y. W. Teh, M. I. Jordan, M. J. Beal, and D. M. Blei. Hierarchical dirichlet processes. In Proc. NIPS, 2004.*

C. Wang and D. M. Blei. 2009. Variational inference for the nested Chinese restaurant process. In NIPS.*

David M. Blei, et al., "The Nested Chinese Restaurant Process and Bayesian Nonparametric Inference of Topic Hierarchies", Aug. 27, 2009, 38 pages.

International Search Report dated Aug. 30, 2012 in connection with International Patent Application No. PCT/CN2012/075842.

Asli Celikyilmaz, et al., "A Hybrid Hierarchical Model for Multi-Document Summarization", Proceedings of the 48th Annual Meeting of the Association for Computational Linguistics, Jul. 11-17, 2010, p. 815-824.

Zhang Minghui, et al., "An Automatic Summarization Approach Based on LDA Topic Feature", Computer Applications and Software, vol. 28, No. 10, Oct. 2011, 4 pages.

International Search Report dated Aug. 30, 2012 issued in connection with International Patent Application No. PCT/CN2012/075842, 5 pages.

* cited by examiner

… (1) …

SYSTEM, METHOD AND APPARATUS FOR INCREASING SPEED OF HIERARCHIAL LATENT DIRICHLET ALLOCATION MODEL

CROSS-REFERENCE TO RELATED APPLICATIONS

This application is a continuation of International Application No. PCT/CN2012/075842, filed on May 22, 2012, which claims priority to Chinese Patent Application No. 201110424177.0, filed on Dec. 16, 2011, both of which are hereby incorporated by reference in their entireties.

TECHNICAL FIELD

The present invention relates to the field of information retrieval technologies, and in particular, to a data processing method and system, and a relevant apparatus.

BACKGROUND

Information retrieval (Information Retrieval) refers to a process and technology of organizing and storing information in a certain manner, and finding relevant information according to a requirement of an information user. The information retrieval in a narrow sense only refers to a process of finding required information from an information set, and is equivalent to a so-called information query. Currently, along with the rapid development of the Internet, information on the Internet increases exponentially, and when facing such huge amount of information resources, how to rapidly acquire their required information in a high efficiency is more and more important for people. In order to improve the quality and efficiency of information retrieval for a user, an information retrieval tool having powerful functions, that is, a search engine, may be used. However, the search engine, when bringing about huge convenience for the user, also exposes many defects as a search technology having a key word as a basic index unit. In one aspect, no matter what key word is submitted by the user, excessive results are returned, and information really required by the user only accounts for a small part, so the user has to expend much time in manually filtering the results. In the other aspect, due to a reason of synonyms and near-synonyms, many texts related to a search topic do not completely match a key word input by the user, which causes the search engine to not find these texts. Performing classification and retrieval on information based on topics is an efficient way for solving the foregoing problem, which can solve a problem of heterogeneous and messy information on the Internet to a large extent, thereby shrinking a search space, increasing a retrieval speed, and improving query results.

In the conventional art, during a process of solving for a hierarchical Latent Dirichlet Allocation (hLDA, hierarchical Latent Dirichlet Allocation) model hyper-parameter, for one given text set, firstly a nested Chinese restaurant process (nCRP) prior corresponding to the model needs to be given, the hLDA model hyper-parameter is considered as a constant, a corresponding topic path is acquired for each document through distributed Gibbs Sampling, one corresponding topic is acquired for each word in a document, and finally, a most approximate parameter hLDA model hyper-parameter is calculated according to topic-word and document-topic counting matrices.

However, in the conventional art, the hLDA model hyper-parameter is considered as a constant, and therefore, during the process of solving, a maximum approximation cannot be reached, so a final parameter hLDA model hyper-parameter obtain through solving has low precision, and a solving speed is slow.

SUMMARY

Embodiments of the present invention provide a data processing method and system, and a relevant apparatus, for increasing the parameter solving speed of an hLDA model through parallel solving, and improving the parameter solving precision of the hLDA model through maximum likelihood-based hyper-parameter estimation.

A data processing method in an embodiment of the present invention includes: sending global initial statistical information to each slave node, where the global initial statistical information includes: text subset information divided in advance according to a text set, preset initial hyper-parameter information of a hierarchical Latent Dirichlet Allocation model, a pre-established nested Chinese restaurant process prior of the text set, hierarchical topic path information of a document, document-topic count matrix information, and topic-word count matrix information; merging received local statistical information of each slave node, to obtain new global statistical information, where the local statistical information includes: a document-topic count matrix, a topic-word count matrix and a document hierarchical topic path of each slave node, and the new global statistical information includes: global text-topic count matrix information, topic-word count matrix information, topic-word count matrix information of each slave node, and a global document hierarchical topic path; if Gibbs sampling performed by a slave node has ended, calculating a probability distribution between the document and a topic and a probability distribution between the topic and a word according to the new global statistical information, where the Gibbs sampling is used to allocate a topic for each word of each document, and allocate a hierarchical topic path for each document; according to the probability distributions obtained through calculation, establishing a likelihood function of the text set, and maximizing the likelihood function, to obtain a new hierarchical Latent Dirichlet Allocation model hyper-parameter; and if iteration of solving for a hierarchical Latent Dirichlet Allocation model hyper-parameter has converged, and according to the new hierarchical Latent Dirichlet Allocation model hyper-parameter, calculating and outputting the probability distribution between the document and topic and the probability distribution between the topic and word.

A data processing method in an embodiment of the present invention includes: receiving global initial statistical information sent by a master node, where the global initial statistical information includes: text subset information divided in advance according to a text set, preset initial hyper-parameter information of a hierarchical Latent Dirichlet Allocation model, a pre-established nested Chinese restaurant process prior of the text set, hierarchical topic path information of a document, document-topic count matrix information, and topic-word count matrix information; according to a hierarchical topic path of each document, reallocating a topic for each word in each document through Gibbs sampling; according to the nested Chinese restaurant process prior, and an updated document-topic count matrix and topic-word count matrix, reallocating a hierarchical topic path for each document through Gibbs sampling; and sending local statistical information to the master node, where the local statistical information includes: document-topic count matrix information and topic-word count matrix information of a present slave node and hierarchical topic path information of each document which are updated and are of a present slave node.

A master node in an embodiment of the present invention includes: a sending unit, configured to send global initial statistical information to each slave node, where the global initial statistical information includes: text subset information divided in advance according to a text set, preset initial hyper-parameter information of a hierarchical Latent Dirichlet Allocation model, a pre-established nested Chinese restaurant process prior of the text set, hierarchical topic path information of a document, document-topic count matrix information, and topic-word count matrix information, further configured to, if Gibbs sampling performed by a slave node does not end, send new global statistical information to the slave node, and configured to, if iteration of solving for a hierarchical Latent Dirichlet Allocation model hyper-parameter does not converge, send the slave node the new global statistical information having a hierarchical Latent Dirichlet Allocation model hyper-parameter updated; a merging unit, configured to merge received local statistical information of each slave node, to obtain new global statistical information, where the local statistical information includes: a document-topic count matrix, a topic-word count matrix and a document hierarchical topic path of each slave node, and the new global statistical information includes: global text-topic count matrix information, topic-word count matrix information, topic-word count matrix information of each slave node, and a global document hierarchical topic path; a calculating unit, configured to, if the Gibbs sampling performed by the slave node has ended, calculate a probability distribution between the document and a topic, and a probability distribution between the topic and a word according to the new global statistical information, further configured to, according to the probability distributions obtained through calculation, establish a likelihood function of the text set, and maximize the likelihood function, to obtain a new hierarchical Latent Dirichlet Allocation model hyper-parameter, and configured to, if iteration of solving for a hierarchical Latent Dirichlet Allocation model hyper-parameter converges, and according to the new hierarchical Latent Dirichlet Allocation model hyper-parameter, calculate and output the probability distribution between the document and topic and the probability distribution between the topic and word.

A slave node in an embodiment of the present invention includes: an information receiving unit, configured to receive global initial statistical information sent by a master node, where the global initial statistical information includes: text subset information divided in advance according to a text set, preset initial hyper-parameter information of a hierarchical Latent Dirichlet Allocation model, a pre-established nested Chinese restaurant process prior of the text set, hierarchical topic path information of a document, document-topic count matrix information, and topic-word count matrix information; a topic allocating unit, configured to, according to a hierarchical topic path of each document, reallocate a topic for each word in each document through Gibbs sampling; a path allocating unit, configured to, according to the nested Chinese restaurant process prior, and an updated document-topic count matrix and topic-word count matrix, reallocate a hierarchical topic path for each document through Gibbs sampling; an information sending unit, configured to send local statistical information to the master node, where the local statistical information includes: document-topic count matrix information and topic-word count matrix information and hierarchical topic path information of each document which are updated and are of a present slave node.

A data processing system includes the foregoing master node and the foregoing slave node.

It can be seen from the foregoing technical solutions that, the embodiments of the present invention have the following advantages: the master node sends the global initial statistical information to each slave node, merges the local statistical information from each slave node to obtain the new global statistical information; judges whether the Gibbs sampling performed by the slave node ends, and if does not end, sends the new global statistical information to the slave node for continuing the sampling process, and if has ended, calculates the probability distribution between the document and topic and the probability distribution between the topic and word according to the new global statistical information; according to the probability distributions obtained through calculation, establishes the likelihood function of the text set, and maximizes the likelihood function to obtain the new hLDA model hyper-parameter; judges whether the iteration of solving for the hLDA model hyper-parameter iteration converges, and if yes, according to the new hLDA model hyper-parameter, calculates and outputs the probability distribution between the document and topic and the probability distribution between the topic and word, and if no, updates the hLDA model hyper-parameter of the new global statistical information and then sends the information to the slave node for performing next sampling calculation. The hLDA model hyper-parameter is added as a variable to the data processing process, and moreover, by judging whether the sampling of the slave node ends and whether the iteration of solving for the hLDA model hyper-parameter converges, the hLDA model hyper-parameter is solved for continuously and repeatedly, a maximum likelihood-based hLDA model hyper-parameter increases the solving precision, and meanwhile, parallel solving is performed by using a parallel system in which one master node interacts with several slave nodes, which can increase the solving speed, so as to make a data processing result faster and more accurate.

BRIEF DESCRIPTION OF THE DRAWINGS

To illustrate technical solutions in embodiments of the present invention more clearly, accompanying drawings to be used for describing the embodiments are introduced briefly in the following. Apparently, the accompanying drawings in the following description are only some embodiments of the present invention, and persons of ordinary skill in the art can derive other drawings from these accompanying drawings without creative efforts.

DETAILED DESCRIPTION

Technical solutions in embodiments of the present invention are described clearly and completely in the following with reference to accompanying drawings. Apparently, the described embodiments are only part rather than all of the embodiments of the present invention. All other embodiments, which can be derived by persons of ordinary skill in the art based on the embodiments of the present invention without creative efforts, shall fall within the protection scope of the present invention.

The embodiments of the present invention provide a data processing method and system, and a relevant apparatus, for increasing the parameter solving speed of an hLDA model through parallel solving, and improving the parameter solving precision of the hLDA model through maximum likelihood-based hyper-parameter estimation.

Performing classification and retrieval on information based on topics can solve a problem of heterogeneous and messy information on the Internet to a large extent, thereby shrinking a search space, increasing a retrieval speed, and improving a query result. A main task of performing classification and retrieval on a text is automatically determining the type of correlation according to text content. Currently, widely used methods include a text classification method based on statistics and machine learning and common classification methods based on statistics such as: a simple vector distance classification method, a Bayes classification method, a nearest-neighbor learning algorithm, and a support vector machine.

Currently, what are the most widely applied are a latent dirichlet allocation (LDA, Latent Dirichlet Allocation) model and a hierarchical latent dirichlet allocation (hLDA, hierarchical Latent Dirichlet Allocation) model. The LDA model is a probability generating model, uses a K-dimensional latent random variable, which complies with Dirichlet distribution, to represent a mixing ratio of topics in a text, extracts corresponding topic distribution from a text set by using parameter estimation, and can effectively reduce the dimension of discrete data. Although the LDA model can extract a topic set of the text and capture related information between a word and a topic, the LDA model cannot reveal abstract hierarchy of each topic and correlation between topics. The hLDA model, as an extended form of the LDA model, compensates for defects of the LDA model. The hLDA model is a hierarchical topic model, which can not only extract the topic of the text, but also capture the correlation between the topics. The hLDA model, on the basis of a nested Chinese restaurant process (nCRP, nested Chinese restaurant Process) prior, organizes the topics into one topic tree, where the depth and number of branches of the topic tree are infinite, each node corresponds to one topic, a topic closer to a root node has stronger abstraction, and a topic closer to a leave node is more specific.

Figure 1:
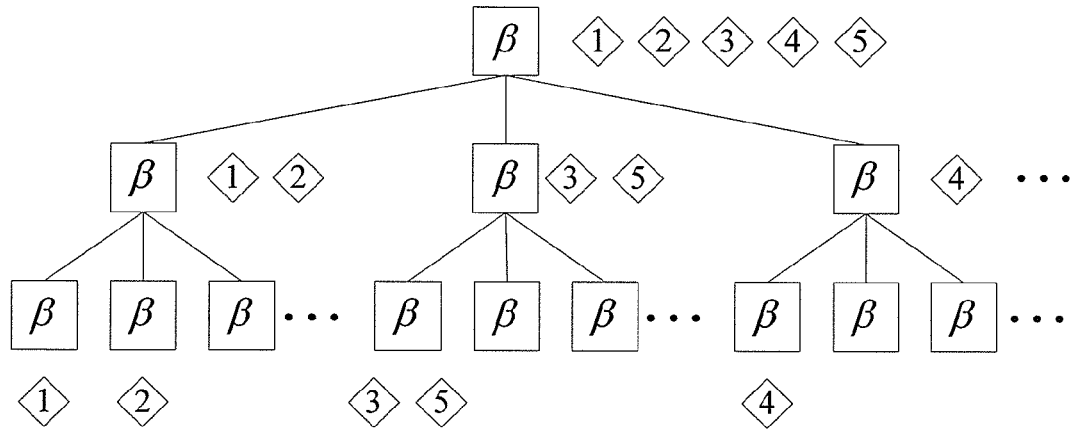
FIG. 1 is a schematic structural diagram of a three-layer nCRP topic tree.

Referring to FIG. 1, a three-layer nCRP topic tree is shown in FIG. 1, where each square represents one restaurant and corresponds to one topic distribution β, each restaurant has an infinite number of tables, each table has one card, and the card indicates one unique restaurant of a next layer. Assume that a restaurant has 5 guests. In the first day, the 5 guests go to a restaurant at a first layer, each guest selects one table, number 1 guest and number 2 guest sit on a same table, number 3 guest and number 5 guest both sit on another table, and number 4 guest sits on a third table; in a second day, number 1 guest and number 2 guest enter a same restaurant according to an instruction of a card on the table on which they sit in the first day, and sit on two different tables, number 3 guest and number 5 guest enter another restaurant according to an instruction of a card on the table on which they sit in the first day, and sit on a same table, and number 4 guest enters a third restaurant according to a same method and sits on one table; in a third day, number 1 guest and number 2 guest separately enter a respective restaurant according to instructions of cards on tables on which they sit in the second day, number 3 guest and number 5 guest enter a same restaurant again, number 4 guest enters one restaurant according to an instruction of a card, and a final seat distribution result is as that of bottom seats in FIG. 1.

A process of generating one text through an hLDA model is as follows:

(1) Give one nCRP prior;

(2) Acquire a topic-word probability distribution $\beta_k \sim \text{Dir}(\eta)$;

(3) Extract a layer L topic path $c \sim \text{nCRP}(\gamma)$, and extract a topic probability distribution $\theta \sim \text{Dir}(\alpha)$;

(4) Extract a topic $z_n \sim \text{Mult}(\theta)$; and (5) Extract a word $w_n \sim \text{Mult}(\beta_c[z_n])$.

(4) and (5) are repeated until a processing requirement of the text is satisfied.

A data processing method in an embodiment of the present invention is described in the following, and referring to FIG. 2, an embodiment of the data processing method in the embodiments of the present invention includes:

201: A master node sends global initial statistical information to each slave node.

In the embodiment of the present invention, an hLDA model hyper-parameter is solved through a distributed system, the distributed system is formed of a series of computers accessing a certain data switching network together, where one computer serves as a master node, and other P computers serve as slave nodes.

The master node sends the global initial statistical information to each slave node, where the global initial statistical information includes: text subset information divided in advance according to a text set, preset initial hyper-parameter information of an hLDA model, a pre-established nCRP prior of the text set, hierarchical topic path information of a document, document-topic count matrix information, and topic-word count matrix information.

The "word" in the embodiment of the present invention refers to a single word, includes Chinese and foreign words, and for ease of illustration, the following embodiments all follow this principle.

202. Merge received local statistical information of each slave node, to obtain new global statistical information.

Merging calculation is performed on the received local statistical information of each slave node, to obtain the new global statistical information.

The local statistical information includes: a document-topic count matrix, a topic-word count matrix and a document hierarchical topic path of each slave node.

The new global statistical information includes: global text-topic count matrix information, topic-word count matrix information, topic-word count matrix information of each slave node, and a global document hierarchical topic path.

Specifically, the local statistical information of each slave node is received, and is specifically the text-topic count matrix $n^{d^p}$, the topic-word count matrix $n^{w^p}$, and the document hierarchical topic path $C_d^p$.

203. If Gibbs sampling performed by a slave node has ended, calculate a probability distribution between the document and a topic and a probability distribution between the topic and a word according to the new global statistical information.

If the Gibbs sampling performed by the slave node has ended, the probability distribution between the document and topic p(Z|d) and the probability distribution between the topic and word p(W|Z) are calculated according to the new global statistical information.

204. According to the probability distributions obtained through calculation, establish a likelihood function of the text set, and maximize the likelihood function, to obtain a new hLDA model hyper-parameter.

The likelihood function of the text set is established as follows according to the Bayesian theory:

$$L(\gamma, \eta, \alpha) = \sum_{d=1}^{D} \log p(w_d | \gamma, \eta, \alpha)$$

By maximizing the likelihood function $L(\gamma,\eta,\alpha)$, model hyper-parameters $\gamma^{(n)}, \eta^{(n)}, \alpha^{(n)}$ of this iteration are solved for with formulas as follows:

$$\mu' = \underset{\mu}{\mathrm{argmax}}\left\{\sum_{d=1}^{M} \log p(w_d | \mu, \eta, \alpha)\right\}$$

$$\eta' = \underset{\eta}{\mathrm{argmax}}\left\{\sum_{d=1}^{M} \log p(w_d | \mu, \eta, \alpha)\right\}$$

$$\alpha' = \underset{\eta}{\mathrm{argmax}}\left\{\sum_{d=1}^{M} \log p(w_d | \mu, \eta, \alpha)\right\}$$

205. If iteration of solving for an hLDA model hyper-parameter converges, and according to the new hLDA model hyper-parameter, calculate and output the probability distribution between the document and topic and the probability distribution between the topic and word.

If the iteration of solving for the hLDA model hyper-parameter converges, and according to the new hLDA model hyper-parameter, the probability distribution between the document and topic and the probability distribution between the topic and word are calculated, and the probability distributions obtained through calculation are output.

In the embodiment of the present invention, the master node sends the global initial statistical information to each slave node, merges the local statistical information from each slave node, to obtain the new global statistical information; if the Gibbs sampling performed by the slave node has ended, calculates the probability distribution between the document and topic and the probability distribution between the topic and word according to the new global statistical information; according to the probability distributions obtained through calculation, establishes the likelihood function of the text set, and maximizes the likelihood function to obtain the new hLDA model hyper-parameter; and performs determination, and if the iteration of solving for the hLDA model hyper-parameter converges, and according to the new hLDA model hyper-parameter, calculates and outputs the probability distribution between the document and topic and the probability distribution between the topic and word. The hLDA model hyper-parameter is added as a variable to the data processing process, by judging whether the sampling of the slave node ends and whether the iteration of solving for the hLDA model hyper-parameter converges, the hLDA model hyper-parameter is solved for continuously and repeatedly, a maximum likelihood-based hLDA model hyper-parameter increases the solving precision, and meanwhile, parallel solving is performed by using a parallel system in which one master node interacts with several slave nodes, which can increase the solving speed, and meanwhile, the maximum likelihood-based hLDA model hyper-parameter increasing hLDA model hyper-parameter increases the solving precision, so as to make a data processing result faster and more accurate.

Figure 3A:
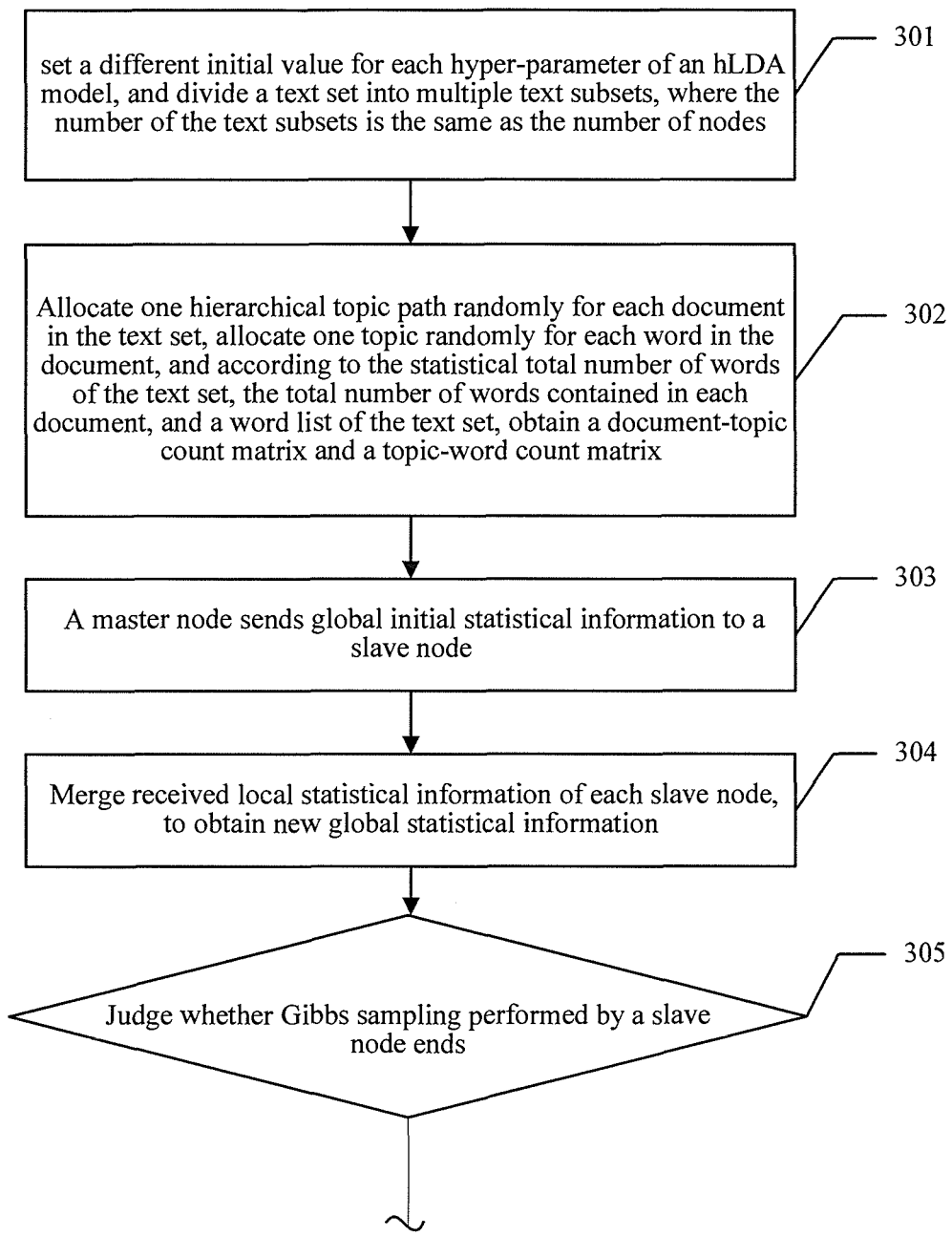
FIG. 3A and FIG. 3B are a schematic diagram of another embodiment of a data processing method according to an embodiment of the present invention.
Figure 3B:
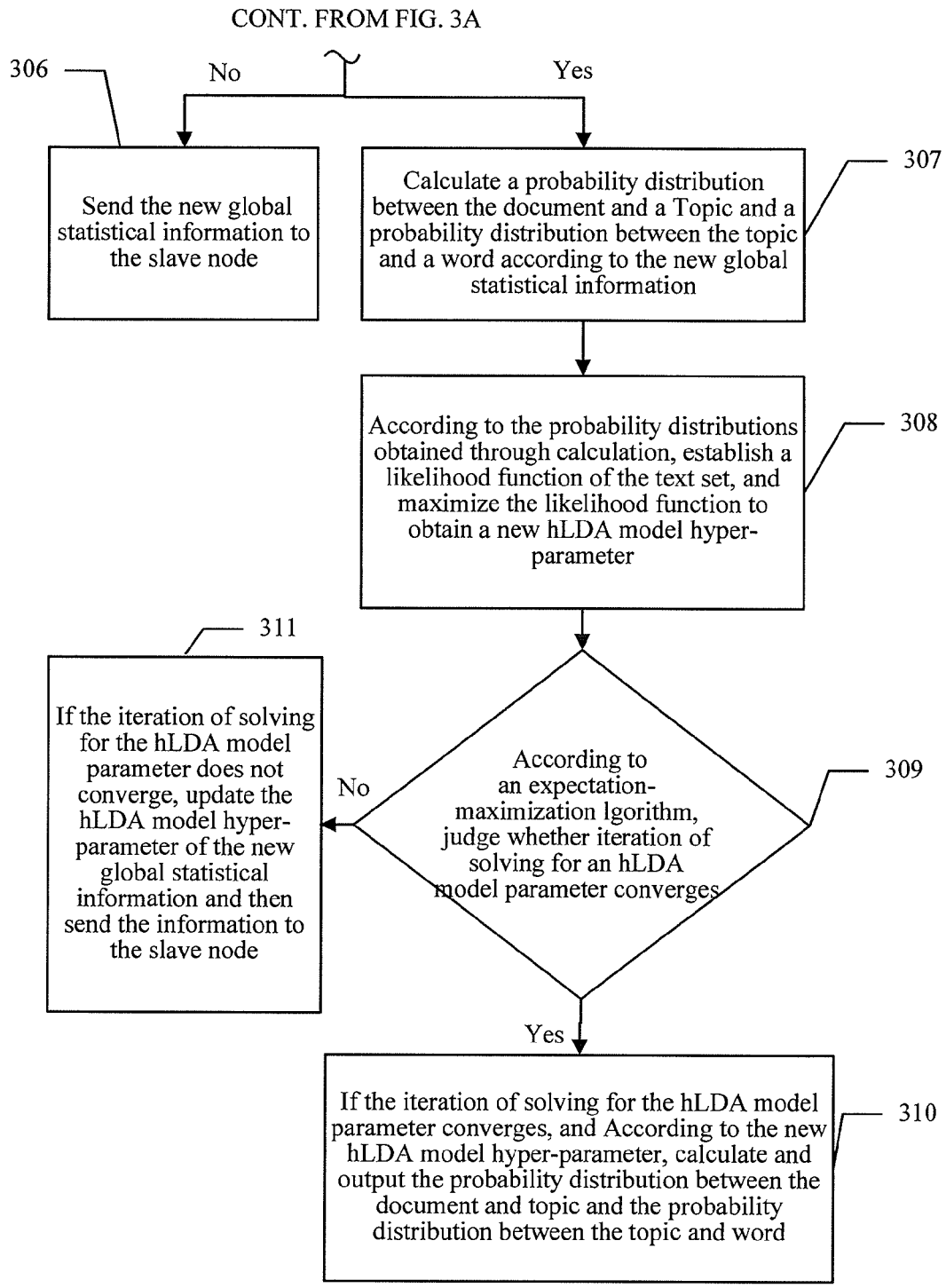

For ease of understanding, the data processing method in the embodiments of the present invention is described below through another embodiment. Referring to FIG. 3, another embodiment of the data processing method in the embodiments of the present invention includes:

301. Set a different initial value for each hyper-parameter of an hLDA model, and divide a text set into multiple text subsets, where the number of the text subsets is the same as the number of nodes.

A master node sets one initial value for each hyper-parameter of the hLDA model, and the initial value of each hyper-parameter is different, for example, $\gamma=\gamma_0$, $\eta=\eta_0$, $\alpha=\alpha_0$.

The text set is divided into multiple text subsets, and the number of the subsets is the same as the number of the nodes. For example, the master node divides an input text set $\{d_i\}$ (i=1, ..., D) containing D documents into P subsets, establishes one index for each subset, and marks each text subset as $D^p$(p=1, ..., P).

302. Allocate one hierarchical topic path for each document in the text set, allocate one topic for each word in a document, and according to the statistical total number of words of the text set, the total number of words contained in each document, and a word list of the text set, obtain a document-topic count matrix and a topic-word count matrix.

One hierarchical topic path is allocated for each document in the text set randomly or according to an initial hLDA model hyper-parameter, and one topic is allocated for each word in the document randomly or according to the initial hLDA model hyper-parameter.

Make statistics on relevant information of the text set, where the relevant information contains the total number of the words of the text set, the total number of the words contained in each document, and the word list of the text set.

The master node makes statistics to obtain the total number of the words contained in the text set, the total number $N_i$ of the words contained in each document, and the unique word list $\{w_j\}$ (j=1, ..., V) of the text set.

303. The master node sends global initial statistical information to each slave node.

In the embodiment of the present invention, an hLDA model hyper-parameter is solved for through a distributed system, the distributed system is formed of a series of computers accessing a certain data switching network together, where one computer serves as a master node, and other P computers serve as slave nodes.

The master node sends the global initial statistical information to each slave node, where the global initial statistical information includes: text subset information divided in advance according to a text set, preset initial hyper-parameter information of the hLDA model, a pre-established nCRP prior of the text set, hierarchical topic path information of the document, document-topic count matrix information, topic-word count matrix information, the total number of the words of the text set, the total number of the words contained in each document, and the word list of the text set.

304. Merge received local statistical information of each slave node, to obtain new global statistical information.

Merging calculation is performed on the received local statistical information of each slave node, to obtain the new global statistical information.

The local statistical information includes: a document-topic count matrix, a topic-word count matrix and a document hierarchical topic path of each slave node.

The new global statistical information includes: global text-topic count matrix information, topic-word count matrix information, topic-word count matrix information of each slave node, and a global document hierarchical topic path.

Specifically, the local statistical information of each slave node is received, and is specifically the text-topic count matrix $n^{d^p}$, the topic-word count matrix $n^{w^p}$, and the document hierarchical topic path $C_d^p$.

305. Judge whether Gibbs sampling performed by a slave node ends.

Through Gibbs sampling, each slave node allocates a topic for each word of each document, and allocates a hierarchical topic path for each document.

The master node receives the local statistical information of each slave node, judges whether the Gibbs sampling performed on the slave node ends, and specifically, according to the number of times of iteration of the Gibbs sampling or the gradient of the likelihood function, judges whether the Gibbs sampling ends.

If no, execute step 306; if yes, execute step 307.

306. Send the new global statistical information to the slave node.

If the Gibbs sampling performed by the slave node ends, the new global statistical information of this statistics is sent to the slave node, and the slave node continues to, through Gibbs sampling, allocate a topic for each word of each document and allocate a hierarchical topic path for each document.

307. Calculate a probability distribution between the document and a topic and a probability distribution between the topic and a word according to the new global statistical information.

If the Gibbs sampling performed by the slave node has ended, the probability distribution between the document and topic p(Z|d) and the probability distribution between the topic and word p(W|Z) are calculated according to the new global statistical information.

308. According to the probability distributions obtained through calculation, establish a likelihood function of the text set, and maximize the likelihood function, to obtain a new hLDA model hyper-parameter.

The likelihood function of the text set is established as follows according to the Bayesian theory:

$$L(\gamma, \eta, \alpha) = \sum_{d=1}^{D} \log p(w_d \mid \gamma, \eta, \alpha)$$

By maximizing the likelihood function $L(\gamma,\eta,\alpha)$, model hyper-parameters $\gamma^{(n)}, \eta^{(n)}, \alpha^{(n)}$ of this iteration are solved for with formulas as follows:

$$\mu' = \underset{\mu}{\operatorname{argmax}}\left\{\sum_{d=1}^{M} \log p(w_d \mid \mu, \eta, \alpha)\right\}$$

$$\eta' = \underset{\eta}{\operatorname{argmax}}\left\{\sum_{d=1}^{M} \log p(w_d \mid \mu, \eta, \alpha)\right\}$$

$$\alpha' = \underset{\eta}{\operatorname{argmax}}\left\{\sum_{d=1}^{M} \log p(w_d \mid \mu, \eta, \alpha)\right\}$$

309. Judge, according to an expectation-maximization algorithm, whether iteration of solving for an hLDA model hyper-parameter converges.

The judging, according to the expectation-maximization algorithm, whether the iteration of solving for the hLDA model hyper-parameter converges is specifically, when the gradient of a likelihood function value of the text set corresponding to the hLDA model hyper-parameter is less than a preset gradient threshold, it is determined that iteration of the expectation-maximization algorithm has converged. The preset gradient threshold of the likelihood function value of the text set may be set specifically according to actual application, and is not specifically limited herein.

If yes, execute step 310, and if no, execute step 311.

310. If the iteration of solving for the hLDA model hyper-parameter converges, and according to the new hLDA model hyper-parameter, calculate and output the probability distribution between the document and topic and the probability distribution between the topic and word.

If the iteration of solving for the hLDA model hyper-parameter converges, and according to the new hLDA model hyper-parameter, the probability distribution between the document and topic and the probability distribution between the topic and word are calculated, and the probability distributions obtained through calculation are output.

311. If the iteration of solving for the hLDA model hyper-parameter does not converge, update the hLDA model hyper-parameter of the new global statistical information and then send the information to the slave node.

If the iteration of solving for the hLDA model hyper-parameter does not converge, the hyper-parameters of the hLDA model are updated to $\gamma=\gamma^{(n)}, \eta=\eta^{(n)}, \alpha=\alpha^{(n)}$, and the updated global statistical information is sent to each slave node, including information about whether the iteration of solving for the hLDA model hyper-parameter converges.

In the embodiment of the present invention, the master node first sets a different initial value for each hyper-parameter of the hLDA model, and divides the text set into multiple text subsets, where the number of the text subsets is the same as the number of nodes; sends one text subset to each slave node, to facilitate data processing by each slave node; allocates one hierarchical topic path for each document in the text set, and allocates one topic for each word in the document; and obtains the document-topic count matrix and the topic-word count matrix, and makes statistics on the relevant information of the text set, where the relevant information includes the total number of words in the text set, the total number of words contained in each document, and the word list of the text set, so that the slave node may perform subsequent processing based on these data.

The data processing method in the embodiment of the present invention is described above from the angle of a master node side, and in the following, it is described from the angle of a slave node side. An embodiment of the data processing method in the embodiments of the present invention includes:

401: Receive global initial statistical information sent by a master node.

A slave node receives the global initial statistical information sent by the master node, the global statistical information includes: text subset information divided in advance according to a text set, preset initial hyper-parameter information of an hLDA model, for example, $\gamma=\gamma_0$, $\eta=\eta_0$, $\alpha=\alpha_0$, a pre-established nCRP prior of the text set, hierarchical topic path information of a document, document-topic count matrix information, and topic-word count matrix information.

402. According to a hierarchical topic path of each document, reallocate a topic for each word in each document through Gibbs sampling.

Based on each hierarchical topic path, one topic $z_{d,n}^P$ is reallocated for each word $w_{d,n}^P$ in the document through Gibbs sampling.

403. According to an nCPR prior, and an updated document-topic count matrix and topic-word count matrix, reallocate a hierarchical topic path for each document through Gibbs sampling.

The slave node reallocates one hierarchical topic path $C_d^P$ for each document $d^P$ through Gibbs sampling and based on the updated document-topic count matrix and topic-word count matrix $n^{d^P}$ and topic-word count matrix $n^{w^P}$.

A formula of Gibbs sampling is as follows:

$$p(C_d^P|W,C_{-d}^P,Z^P) \propto p(C_d^P|C_{-d}^P)p(w_d^P|C,W_{-d}^P,Z^P)$$

404. Send local statistical information to the master node.

The local statistical information is sent to the master node, where the local statistical information includes: document-topic count matrix information and topic-word count matrix information and hierarchical topic path information of each document which are updated and are of a present slave node.

In the embodiment of the present invention, the global initial statistical information sent by the master node is received, where the global initial statistical information includes: the text subset information divided in advance according to the text set, preset initial hyper-parameter information of the hLDA model, pre-established nCRP prior of the text set, hierarchical topic path information of the document, document-topic count matrix information, and topic-word count matrix information; reallocates a topic for each word in each document through Gibbs sampling and according to the hierarchical topic path of each document; reallocates a hierarchical topic path for each document through Gibbs sampling and according to the nCPR prior, and the updated document-topic count matrix and topic-word count matrix; sends the foregoing information as the local statistical information to the master node; through Gibbs sampling, reallocates a topic for each word in each document and reallocates a hierarchical topic path for each document, thereby improving the accuracy for the master node to calculate the hyper-parameter of the hLDA model.

Figure 5:
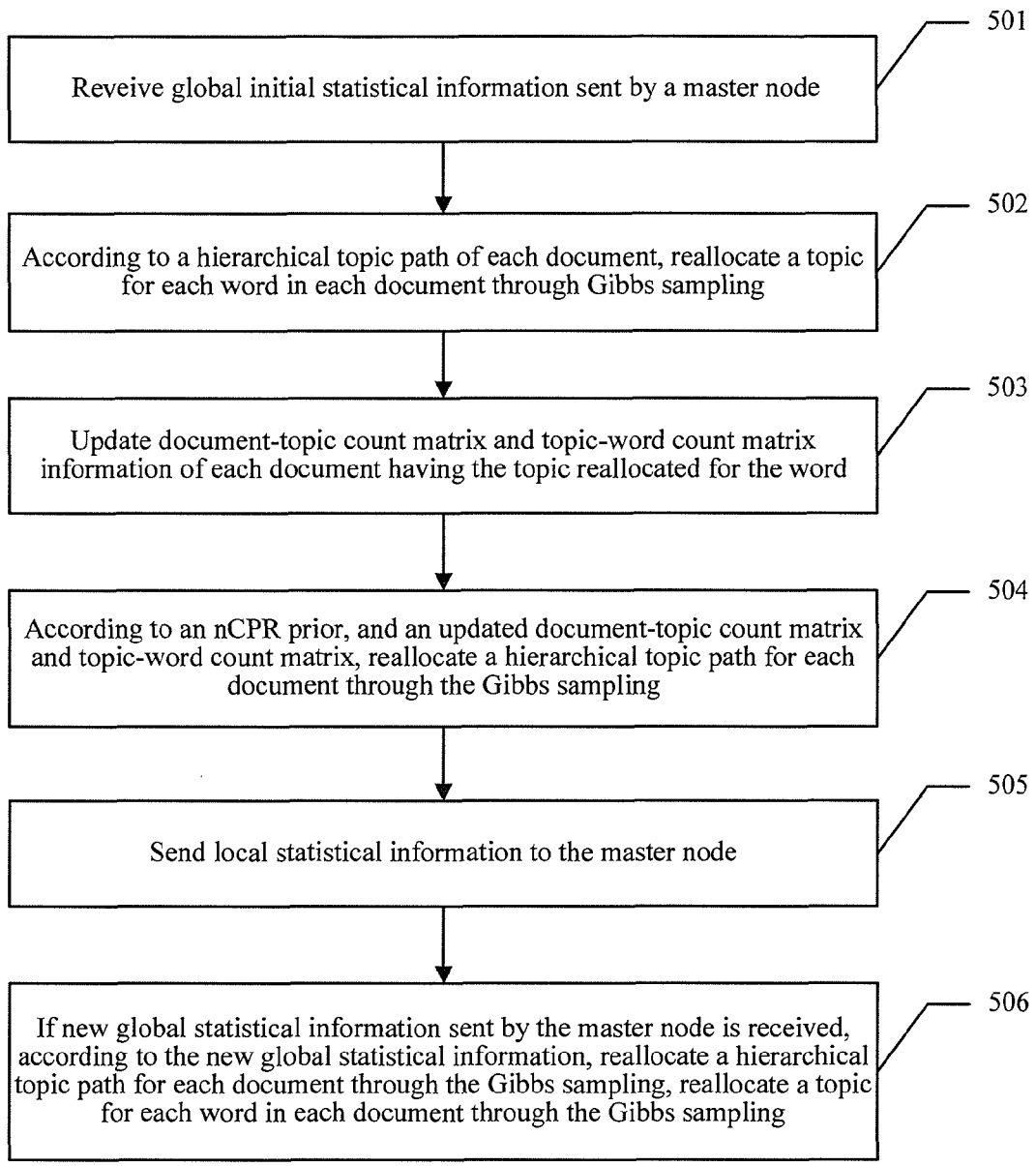
FIG. 5 is a schematic diagram of another embodiment of a data processing method according to an embodiment of the present invention.

For ease of understanding, the data processing method in the embodiments of the present invention is described below through another embodiment. Referring to FIG. 5, another embodiment of the data processing method in the embodiments of the present invention includes:

501. Receive global initial statistical information sent by a master node.

A slave node receives the global initial statistical information sent by the master node, where the global statistical information includes: text subset information divided in advance according to a text set, preset initial hyper-parameter information of an hLDA model, for example, $\gamma=\gamma_0$, $\eta=\eta_0$, $\alpha=\alpha_0$, a pre-established nCRP prior of the text set, hierarchical topic path information of a document, document-topic count matrix information, and topic-word count matrix information.

502. According to a hierarchical topic path of each document, reallocate a topic for each word in each document through Gibbs sampling.

Based on each hierarchical topic path, one topic $z_{d,n}^P$ is reallocated for each word $w_{d,n}^P$ in the document through Gibbs sampling.

Specifically, L hierarchical sub-topics are allocated for each topic of the text subset, and in the L hierarchical sub-topics, the corresponding topic $z_{d,n}^P$ is allocated for each word $w_{d,n}^P$ in the document through Gibbs sampling.

An adopted formula of Gibbs sampling is as follows:

$$p(z_{d,n}^p = C_{d,k} | z_{-(d,n)}^p) \propto (\alpha_k + n_{C_{d,k}}^{dP}) \frac{n_{C_{d,k}, w_{d,n}}^{dP} + \beta_{w_{d,n}}^p}{\sum_{t=1}^{V}(n_{C_{d,k}, t}^{dP} + \beta_t)}$$

$$(v = 1, 2, \ldots, V; k = 1, 2, \ldots, L)$$

503. Update document-topic count matrix and topic-word count matrix information of each document having the topic reallocated for the word.

After reallocating the topics for the words, the slave node updates a document-topic count matrix $n^{d^P}$ and topic-word count matrix $n^{w^P}$ corresponding to the present slave node.

504. According to an nCPR prior, and an updated document-topic count matrix and topic-word count matrix, reallocate a hierarchical topic path for each document through Gibbs sampling.

The slave node reallocates one hierarchical topic path $C_d^P$ for each document $d^P$ through Gibbs sampling and based on the updated document-topic count matrix $n^{d^P}$ and topic-word count matrix $n^{e^P}$.

$$p(C_d^P|W,C_{-d}^P,Z^P) \propto p(C_d^P|C_{-d}^P)p(w_d^P|C,W_{-d}^P,Z^P)$$

505. Send local statistical information to the master node.

The local statistical information is sent to the master node, where the local statistical information includes: document-topic count matrix information and topic-word count matrix information and hierarchical topic path information of each document which are updated and are of a present slave node.

506. If new global statistical information sent by the master node is received, reallocate a hierarchical topic path for each document and reallocate a topic for each word in each document, through Gibbs sampling and according to the new global statistical information.

If the slave node receives the new global statistical information sent by the master node, it indicates that the Gibbs sampling does not end, or EM iteration does not converge, so every time when the slave node receives the new global statistical information sent by the master node, it is required that the slave node repeatedly reallocates a topic for each word in each document through Gibbs sampling and according to the hierarchical topic path of each document; according to the nCPR prior, and the updated document-topic count matrix and topic-word count matrix, reallocates a hierarchical topic path for each document through Gibbs sampling, thereby generating new local statistical information of the present slave node, and sending the master node the information as a basis for the master node to perform estimation of an hLDA model hyper-parameter.

In the implementation of the present invention, the slave node receives the global initial statistical information sent by the master node, reallocates a topic for each word in each document through Gibbs sampling and according to the hierarchical topic path of each document; according to the nCPR prior, and the updated document-topic count matrix and topic-word count matrix, reallocates a hierarchical topic path for each document through Gibbs sampling, thereby generating the new local statistical information of the present slave node, and sending the master node the information as the basis for the master node to perform estimation of the hLDA model hyper-parameter. Every time when the slave node receives the new global statistical information sent by the master node, it is required that the slave node repeatedly reallocates a topic for each word in each document through Gibbs sampling and according to the hierarchical topic path of each document; according to the nCPR prior, and the updated document-topic count matrix and topic-word count matrix, reallocates a hierarchical topic path for each document through Gibbs sampling, thereby generating the new local statistical information of the present slave node, and sending the master node the information as the basis for the master node to perform estimation of the hLDA model hyper-parameter.

The data processing method in the embodiment of the present invention is described through a specific application scenario.

Text Retrieval System:

Most information requirements are directed to texts, so text retrieval is the foundation of information retrieval, and a text retrieval technology may also be used to retrieve other media information, it can be said that the text retrieval is the most important technology in the information retrieval.

The text retrieval mainly includes two key technologies, namely, text storage and text query:

(1) Text storage;

First, a spider searcher continuously searches for latest text information on a network by using a crawler technology, downloads the information to a local storage, and removes text information that is old or does not exist on the network. Then, all locally stored texts are processed by applying an hLDA model, to obtain probability distributions between text-topic and between topic-word, and a hierarchical relationship between topics. Finally, relevant indexes are established for a topic, a word and a text according to a certain rule, and are stored in an index database.

(2) Text query.

A user sends a text requirement to a search engine, the search engine parses the requirement of the user and sends a query requirement to the index database; the index database returns a relevant index according to the probability relationships between the topic, word and text, and the hierarchical relationship between the topics, the search engine sorts query results in order of precedence and sends the results to the user, and the user acquires most concerned text information of the user according to the requirement of the user.

Figure 6:
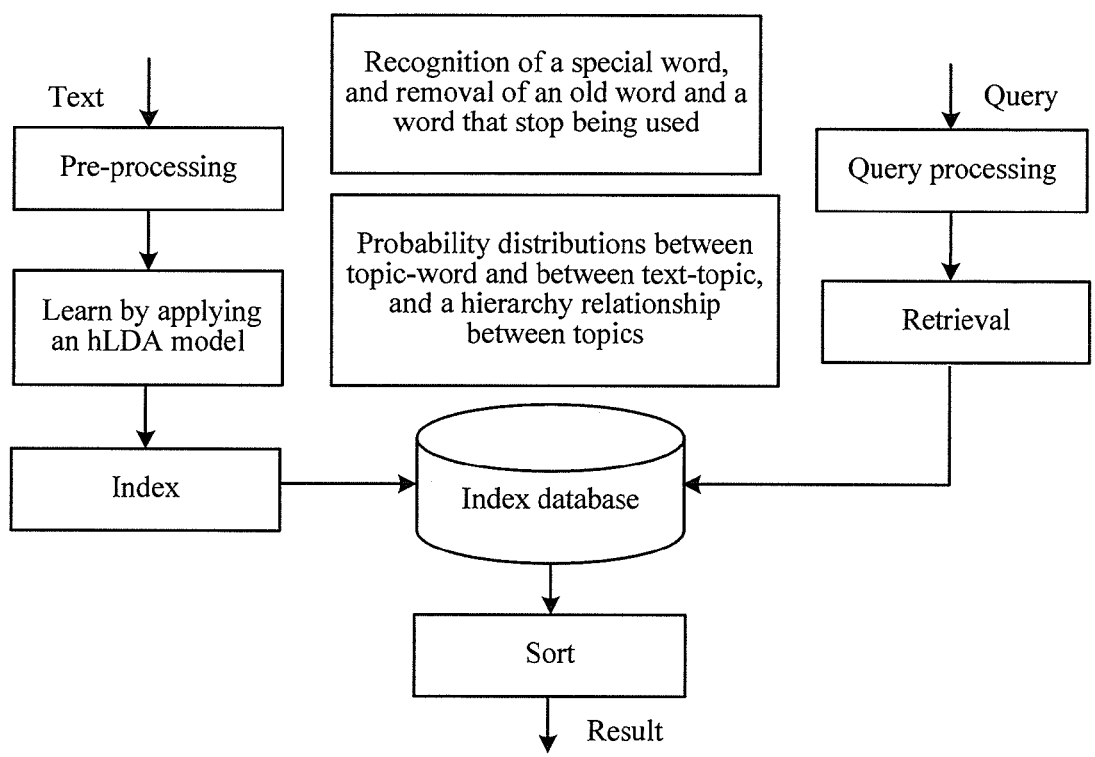
FIG. 6 is a schematic diagram of a basic procedure of text retrieval according to an embodiment of the present invention.

For a basic procedure of the text retrieval, reference is made to FIG. 6.

Implementation steps of a text retrieval system are described as follows:

(1) Input a text set;

(2) Perform pre-processing on the text set;

The pre-processing mainly includes recognition of special words, removal of an old word, a word that stops being used, and some meaningless words such as an article, a preposition and a conjunction. Each text is considered as a set of words, and a sequential relationship between words are not taken into consideration.

(3) Learn the text set by applying an hLDA model;

Topic allocation of each word, a topic path and topic hierarchy of each text are acquired by applying a Gibbs sampling algorithm. Probability distributions between word-topic and between topic-text are calculated, and a parameter and hyper-parameter of the hLDA model are estimated.

(4) Establish an index database;

According to the probability distributions between word-topic and between topic-text, and the hierarchy relationship between the topics, an index table between the word, topic and text is established according to a certain rule, and the index table is stored in the index database.

(5) An user inputs a query requirement;

The user inputs some words or phrases according to the query requirement of the user.

(6) Parse the query;

The query requirement of the user is parsed into a word, a topic, an associated topic or a certain combination between them, according to a certain rule.

(7) Perform retrieval on the index database;

Perform retrieval on the index database according to a parsing result of the query requirement of the user.

(8) Sort retrieval results;

The retrieval results are sorted according to a certain probability relationship.

(9) Output query results.

The query results are output for the user to select.

For ease of understanding, the data processing method in the embodiment of the present invention is described through another application scenario:

Network movie recommendation system:

Currently, movie resources on the Internet increase exponentially, and how to rapid and efficiently download or watch a favorite movie becomes a problem with increasing concern of a user. An existing network movie recommendation technology, for example, adopts a collaborative filtering (CF, Collaborative Filtering) technology to establish a movie recommendation system, and the main idea of a CF movie recommendation technology is that, if some users have preference for some movies, they have preference for other movies. In actual application, users' preference needs to be acquired by learning and exploring movie download histories of the users.

Figure 7:
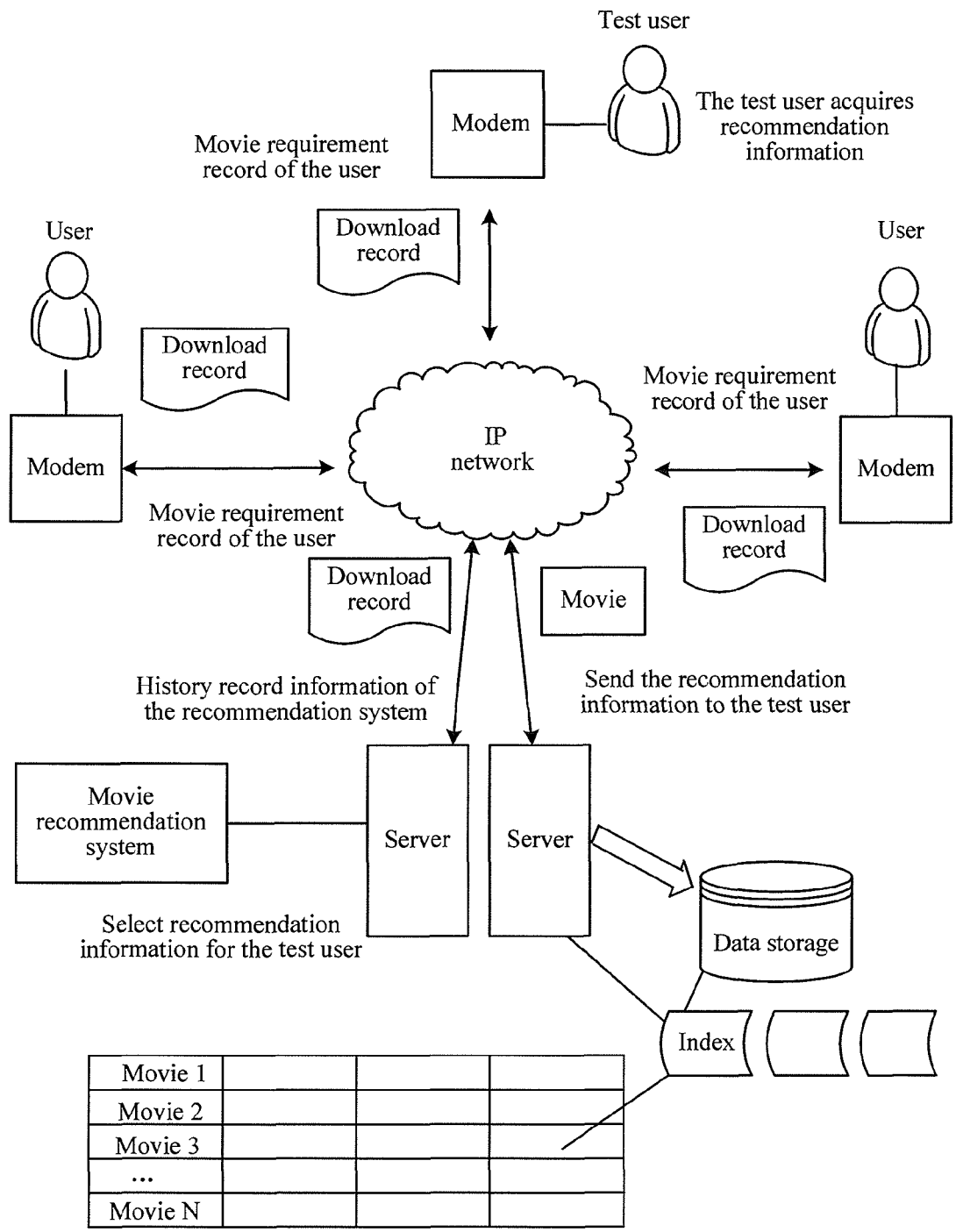
FIG. 7 is a schematic architectural diagram of an network movie recommendation system according to an embodiment of the present invention.

The present network movie recommendation system adopts an hLDA model-based CF technology, and its system architectural diagram shown in FIG. 7.

Figure 8:
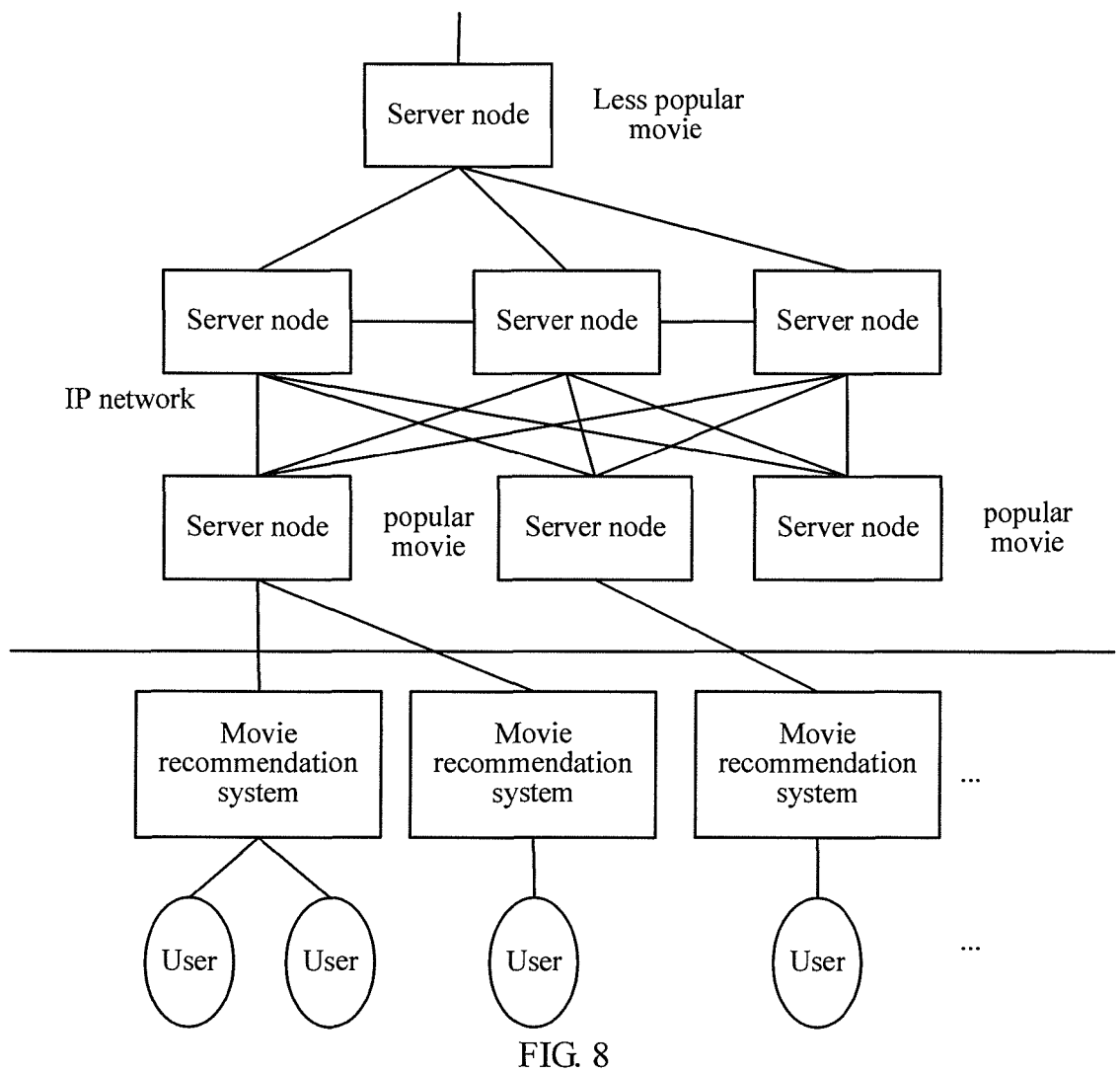
FIG. 8 is a schematic diagram of a network movie storage situation according to an embodiment of the present invention.

In order to save bandwidth resources and relieve network transmission burden, the present movie recommendation system adopts the hLDA model-based CF technology to provide an optimal storage policy of movie resources, that is, by analyzing a movie download record of each user, a popular movie is stored in a node closer to the user on the network, and a less popular movie is stored in a node away from the user. For a schematic diagram of a network movie storage situation, reference is made to FIG. 8.

In the present movie recommendation system, each user is considered as one "text", each movie downloaded by the user is considered as one "word", and specific implementation steps are described as follows:

(1) Collect a movie download record of each user;

(2) Perform pre-processing on a movie download record of a user;

The CF technology is mainly applied to exclude a user with small movie download record scale, so as to avoid affecting a learning effect of an hLDA model.

(3) Apply the hLDA model to learn the movie download records of the users;

Topic allocation of each movie, and a topic path and topic hierarchy of each user are acquired by applying a Gibbs sampling algorithm; probability distributions between movie-topic and between topic-user are calculated, a parameter and hyper-parameter of the hLDA model are estimated. The probability distribution of a topic of a movie downloaded by the user always reflect behavior preference of the user; therefore, according to the probability distributions between movie-topic and between topic-user, behavior preference of each user watching the movie can be obtained through analysis.

(4) Establish an index database;

According to the probability distributions between movie-topic and between topic-user, and a hierarchy relationship between topics, an index table between the movie, topic and user is established according to a certain rule, and is stored in the index database.

(5) According to a download probability distribution of each movie, separately store them in proper locations on the network;

According to a certain rule, a movie having high download probability (that is, the most popular movies) is stored in a server node closer to the user, and a movie having low download probability (that is, the less popular movies) is stored in a server node away from to the user.

(6) Provide preference movie information according to user information;

Users having similar behavior preference often like a similar type of movie. Here, a relevant movie is retrieved directly in the index database according to a certain rule.

(7) The user inputs a movie download requirement;

If the movie provided according to the user information cannot satisfy a requirement of the user, the user may input a movie requirement of the user to the system. A query requirement of the user is parsed separately into a word, a topic, an associated topic or a certain combination of them, according to a certain rule.

(8) Parse the movie download requirement of the user;

The movie download requirement of the user is parsed to a movie, a movie topic, an associated movie topic or a certain combination of them, according to a certain rule.

(9) Perform retrieval on the index database;

Retrieval is performed on the index database according to a resolving result of the user download requirement.

(10) Sort retrieval results;

The retrieval results are sorted according to a certain probability relationship.

(11) Output query results.

The retrieval results are output for the user to select.

Figure 9:
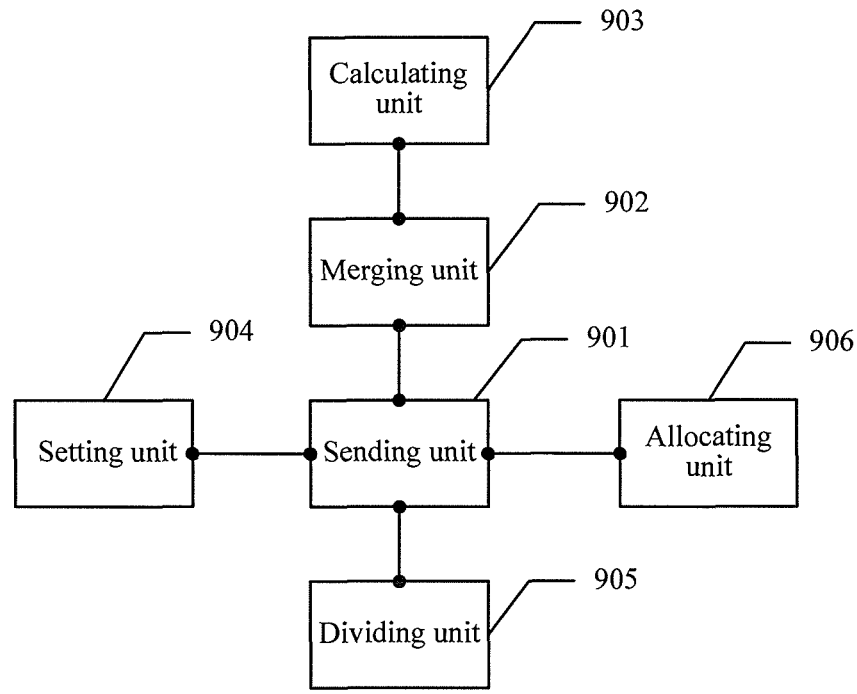
FIG. 9 is a schematic diagram of an embodiment of a master node according to an embodiment of the present invention.

The data processing method in the embodiment of the present invention is introduced above, and a data processing relevant apparatus in an embodiment of the present invention is introduced in the following. The data processing relevant apparatus in this embodiment includes a master node and a slave node. Referring to FIG. 9, an embodiment of the master node in the embodiment of the present invention includes:

a sending unit 901, configured to send global initial statistical information to a slave node, where the global initial statistical information includes: text subset information divided in advance according to a text set, preset initial hyper-parameter information of an hLDA model, a pre-established nCRP prior of the text set, hierarchical topic path information of a document, document-topic count matrix information, and topic-word count matrix information (see steps 201 and 303);

a merging unit 902, configured to merge received local statistical information of each slave node, to obtain new global statistical information, where the local statistical information includes: a document-topic count matrix, a topic-word count matrix and a document hierarchical topic path of each slave node, and the new global statistical information includes: global text-topic count matrix information, topic-word count matrix information, topic-word count matrix information of each slave node, and a global document hierarchical topic path (see steps 202 and 304); and a calculating unit 903, configured to, if Gibbs sampling performed by the slave node has ended, calculate a probability distribution between the document and a topic and a probability distribution between the topic and a word according to the new global statistical information (see steps 203 and 307); further configured to, according to the probability distributions obtained through calculation, establish a likelihood function of the text set, and maximize the likelihood function, to obtain a new hLDA model hyper-parameter (see steps 204 and 308), and configured to, if the iteration of solving for the hLDA model hyper-parameter converges, and according to the new hLDA model hyper-parameter, calculate and output the probability distribution between the document and topic and the probability distribution between the topic and word (see steps 205 and 310).

It should be noted that, the master node in the embodiment of the present invention may further include:

a setting unit 904, configured to set a different initial value for each hyper-parameter of the hLDA model (see step 301);

a dividing unit 905, configured to divide the text set into multiple text subsets, where the number of the text subsets is the same as the number of nodes (see step 301);

an allocating unit 906, configured to allocate one topic path for each document in the text set, allocate one topic for each word in the document, and according to the statistical total number of words in the text set, the total number of words contained in each document, and a word list of the text set, obtain a document-topic count matrix and a topic-word count matrix (see step 302); and a judging unit 907, configured to judge whether the Gibbs sampling performed by the slave node ends, where the Gibbs sampling is used to allocate a topic for each word of each document, and allocate a hierarchical topic path for each document, and specifically, whether the Gibbs sampling ends is judged in a manner of judging, according to the number of times of iteration of the Gibbs sampling or the gradient of the likelihood function, whether the Gibbs sampling ends (see step 305); where the judging unit 907 is further configured to judge, according to an expectation-maximization algorithm, whether iteration of solving for an hLDA model hyper-parameter converges, where, specifically, whether the hLDA model solving iteration converges is judged by determining, when the gradient of a likelihood function value of the text set corresponding to the hLDA model hyper-parameter is less than a preset gradient threshold, that iteration of the expectation-maximization algorithm has converged (see step 309).

Further, the sending unit 901 is further configured to, if the Gibbs sampling performed by the slave node does not end, send the new global statistical information to the slave node (see step 306), and configured to, if the iteration of solving for the hLDA model hyper-parameter does not converge, update the hLDA model hyper-parameter of the new global statistical information and then send the information to the slave node (see step 311).

Figure 2:
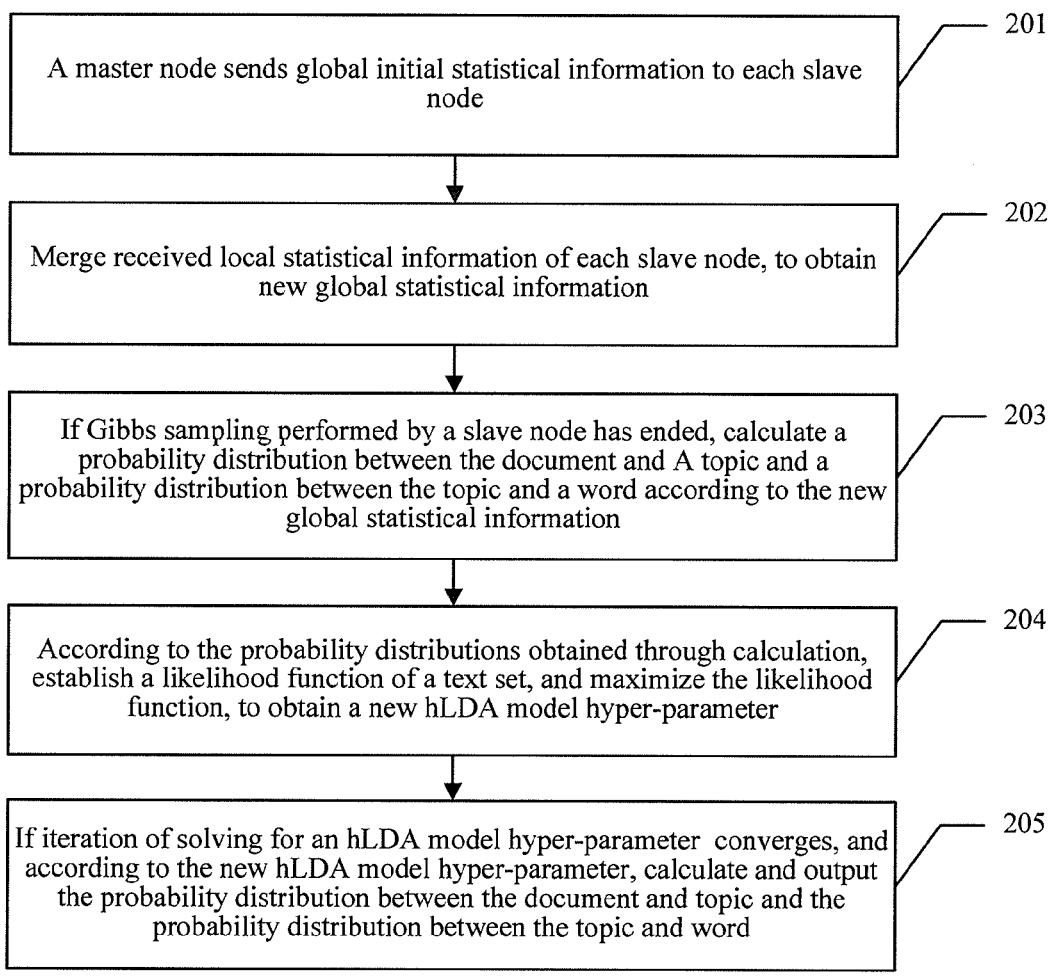
FIG. 2 is a schematic diagram of an embodiment of a data processing method according to an embodiment of the present invention.

For a specific process of each unit of the master node in the embodiment of the present invention implementing its own function, reference is made to the description of relevant content in the embodiments shown in FIG. 2 and FIG. 3.

In the embodiment of the present invention, the setting unit 904 sets a different initial value for each hyper-parameter of the hLDA model; the dividing unit 905 divides the text set into multiple text subsets; the allocating unit allocates one topic path for each document in the text set, allocates one topic for each word in the document, and according to the statistical total number of words of the text set, the total number of words contained in each document, and the word list of the text set, obtains the document-topic count matrix and the topic-word count matrix; the sending unit 901 sends the global initial statistical information to the slave node, where the global initial statistical information includes: the text subset information divided in advance according to the text set, preset initial hyper-parameter information of the hLDA model, pre-established nCRP prior of the text set, hierarchical topic path information of the document, document-topic count matrix information, and topic-word count matrix information; the merging unit 902 merges the received local statistical information of each slave node, to obtain the new global statistical information, where the local statistical information includes: the document-topic count matrix, topic-word count matrix and document hierarchical topic path of each slave node, and the new global statistical information includes: the global text-topic count matrix information, topic-word count matrix information, topic-word count matrix information of each slave node, and the global document hierarchical topic path. The judging unit 907 judges whether the Gibbs sampling performed by the slave node ends, and specifically, according to the number of times of iteration of the Gibbs sampling or the gradient of the likelihood function, judges whether the Gibbs sampling ends. If the Gibbs sampling performed by the slave node does not end, the sending unit 901 sends the new global statistical information to the slave node; and if has ended, the calculating unit 903 calculates, according to the new global statistical information, the probability distribution between the document and topic and the probability distribution between the topic and word, and according to the probability distribution obtained through calculation, establishes the likelihood function of the text set, and maximizes the likelihood function to obtain the new hLDA model hyper-parameter. The judging unit 907 judges, according to the expectation-maximization algorithm, whether the iteration of solving for the hLDA model hyper-parameter converges, and specifically, when the gradient of the likelihood function value of the text set corresponding to the hLDA model hyper-parameter is less than the preset gradient threshold, determines that the iteration of the expectation-maximization algorithm has converged If has converged, the calculating unit 903, and according to the new hLDA model hyper-parameter, calculates and outputs the probability distribution between the document and topic and the probability distribution between the topic and word; and if does not converge, the sending unit 901 updates the hLDA model hyper-parameter of the new global statistical information and then sends the information to the slave node. Parallel solving performed by a parallel system in which one master node interacts with multiple slave nodes may increase a solving speed, and a maximum likelihood-based hLDA model hyper-parameter increases the solving precision, so as to make a data processing result faster and more accurate.

Figure 10:
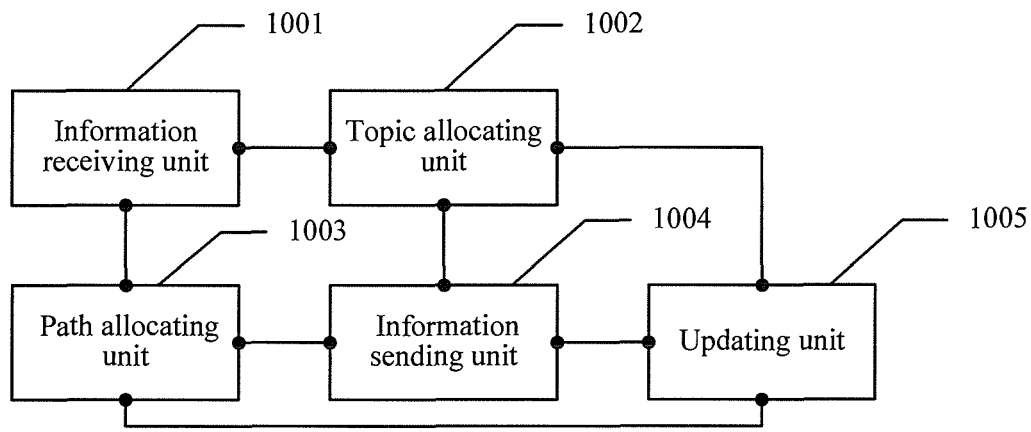
FIG. 10 is a schematic diagram of an embodiment of a slave node according to an embodiment of the present invention.

An slave node in an embodiment of the present invention is introduced in the following. Referring to FIG. 10, an embodiment the slave node in the embodiment of the present invention includes:

an information receiving unit 1001, configured to receive global initial statistical information sent by a master node, where the global initial statistical information includes: text subset information divided in advance according to a text set, preset initial hyper-parameter information of an hLDA model, a pre-established nCRP prior of the text set, hierarchical topic path information of a document, document-topic count matrix information, and topic-word count matrix information (see steps 401 and 501);

a topic allocating unit 1002, configured to, according to a hierarchical topic path of each document, reallocate a topic for each word in each document through Gibbs sampling (see steps 402 and 502);

a path allocating unit 1003, configured to, according to the nCRP prior, and an updated document-topic count matrix and topic-word count matrix, reallocate a hierarchical topic path for each document through Gibbs sampling (see steps 403 and 504); and an information sending unit 1004, configured to send local statistical information to the master node, where the local statistical information includes: document-topic count matrix information and topic-word count matrix information and hierarchical topic path information of each document which are updated and are of a present slave node (see steps 404 and 505).

It should be noted that, the slave node in the embodiment of the present invention further includes:

an updating unit 1005, configured to update the document-topic count matrix and topic-word count matrix of each document having the topic reallocated for the word (see step 503).

Further, the topic allocating unit 1002 is configured to allocate multiple hierarchical sub-topics for each document in a text subset, and in the multiple hierarchical sub-topics, allocate a corresponding topic for each word in the document in a manner of allocating a corresponding topic for each word in the document through Gibbs sampling (see step 502);

The path allocating unit 1003 is further configured to, if new global statistical information sent by the master node is received, reselect a hierarchical topic path for each document through Gibbs sampling and according to the new global statistical information (see step 506);

The topic allocating unit 1002 is further configured to, if the new global statistical information sent by the master node is received, reallocate a topic for each word in each document through Gibbs sampling and according to the new global statistical information (see step 506).

Figure 4:
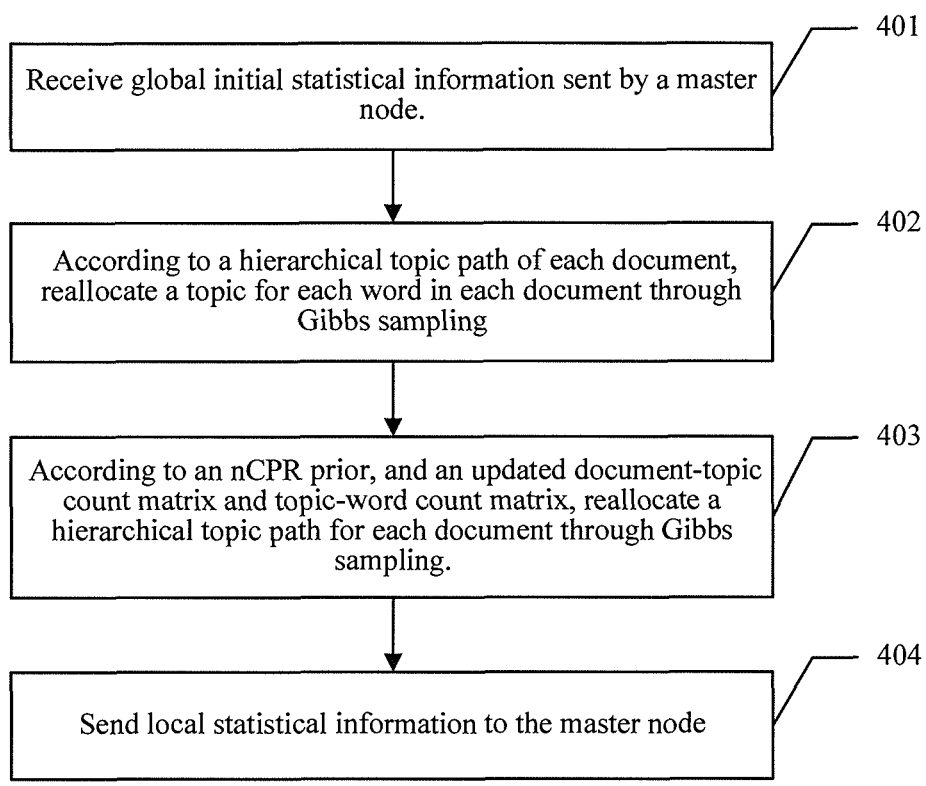
FIG. 4 is a schematic diagram of another embodiment of a data processing method according to an embodiment of the present invention.

For a specific process of each unit of the slave node in the embodiment of the present invention implementing its own function, reference is made to the description of relevant content in the embodiments shown in FIG. 4 and FIG. 5.

In the embodiment of the present invention, the information receiving unit 1001 receives the global initial statistical information sent by the master node, where the global initial statistical information includes: the text subset information divided in advance according to a text set, preset initial hyper-parameter information of an hLDA model, pre-established nCRP prior of the text set, hierarchical topic path information of the document, document-topic count matrix information, and topic-word count matrix information. The topic allocating unit 1002 reallocates, according to the hierarchical topic path of each document, a topic for each word in each document through Gibbs sampling. Specifically, the topic allocating unit 1002 allocates multiple hierarchical sub-topics for each document in the text subset, and in the multiple hierarchical sub-topics, allocates a corresponding topic for each word in the document through Gibbs sampling. The updating unit 1005 updates the document-topic count matrix and topic-word count matrix of each document having the topic reallocated for the word. The path allocating unit 1003, according to the nCRP prior, and the updated document-topic count matrix and topic-word count matrix, reallocates a hierarchical topic path for each document through Gibbs sampling. Afterwards, the information sending unit 1004 sends the local statistical information to the master node, where the local statistical information includes: the document-topic count matrix information and topic-word count matrix information, and the hierarchical topic path information of each document which are updated and are of a present slave node. If the new global statistical information sent by the master node is received, the path allocating unit 1003 reselects a hierarchical topic path for each document through Gibbs sampling and according to the new global statistical information, and the topic allocating unit 1002 reallocates a topic for each word in each document.

Figure 11:
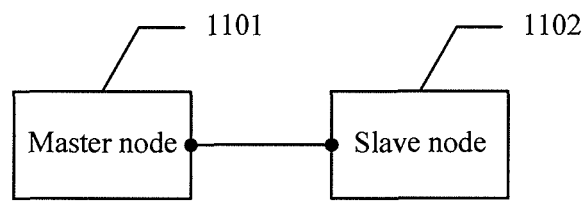
FIG. 11 is a schematic diagram of an embodiment of a data processing system according to an embodiment of the present invention.

A data processing system is further provided in an embodiment of the present invention. Referring to FIG. 11, the data processing system in the embodiment of the present invention includes:

a master node 1101 and a slave node 1102.

The master node 1101 is configured to send global initial statistical information to each slave node, where the global initial statistical information includes: text subset information divided in advance according to a text set, preset initial hyper-parameter information of an hLDA model, a pre-established nCRP prior of the text set, hierarchical topic path information of a document, document-topic count matrix information, and topic-word count matrix information; merge received local statistical information of each slave node, to obtain new global statistical information, where the local statistical information includes: a document-topic count matrix, a topic-word count matrix and a document hierarchical topic path of each slave node, and the new global statistical information includes: global text-topic count matrix information, topic-word count matrix information, topic-word count matrix information of each slave node, and a global document hierarchical topic path; calculate a probability distribution between the document and a topic and a probability distribution between the topic and a word according to the new global statistical information, if Gibbs sampling has ended, where the Gibbs sampling is used to allocate a topic for each word of each document and allocate a hierarchical topic path for each document; according to the probability distributions obtained through calculation, establish a likelihood function of the text set, and maximize the likelihood function, to obtain a new hLDA model hyper-parameter; and if the iteration of solving for the hLDA model hyper-parameter converges, and according to the new hLDA model hyper-parameter, calculate and output the probability distribution between the document and topic and the probability distribution between the topic and word.

The slave node 1102 is configured to receive the global initial statistical information sent by the master node, where the global initial statistical information includes: the text subset information divided in advance according to a text set, preset initial hyper-parameter information of the hLDA model, pre-established nCRP prior of the text set, hierarchical topic path information of the document, document-topic count matrix information, and topic-word count matrix information; according to a hierarchical topic path of each document, reallocate a topic for each word in each document through Gibbs sampling; according to the nCRP prior, and an updated document-topic count matrix and topic-word count matrix, reallocate a hierarchical topic path for each document through Gibbs sampling; and send local statistical information to the master node, where the local statistical information includes: document-topic count matrix information and topic-word count matrix information and hierarchical topic path information of each document which are updated and are of a present slave node.

In the embodiment of the present invention, for function implementation processes of the master node 1101 and the slave node 1102 in the data processing system, reference is made to the relevant description content in the embodiments shown in FIG. 2 to FIG. 10, and the details are not repeated herein.

Those skilled in the art can understand that implementation of all or part of the steps of the method according to the embodiments of the present invention may be completed by a program indicating relevant hardware. The program may be stored in a computer readable storage medium, the above mentioned storage medium may be a read-only memory, a magnetic disk, an optical disk or the like.

The data processing method and system, and relevant apparatus which are provided by the present invention are introduced above in detail. Those skilled in the art can make variations to the present invention in terms of the specific implementation and application scope according to the ideas of the embodiments of the present invention. To sum up, the specification shall not be construed as a limit to the present invention.

What is claimed is:

1. A data processing method, comprising:

sending, by a master node, global initial statistical information to a plurality of slave nodes, wherein the global initial statistical information comprises: text subset information divided in advance according to a text set, preset initial hyper-parameter information of a hierarchical Latent Dirichlet Allocation model, a pre-established nested Chinese restaurant process prior of the text set, hierarchical topic path information of a document, document-topic count matrix information, and topic-word count matrix information;

receiving local statistical information from each of the plurality of slave nodes;

merging the received local statistical information of each slave node, to obtain new global statistical information, wherein the local statistical information comprises: a document-topic count matrix, a topic-word count matrix and a document hierarchical topic path of each slave node, and the new global statistical information comprises: global text-topic count matrix information, topic-word count matrix information, topic-word count matrix information of each slave node, and a global document hierarchical topic path;

after judging that a Gibbs sampling performed by a slave node has ended, calculating a probability distribution between the document and a topic and a probability distribution between the topic and a word according to the new global statistical information, wherein the Gibbs sampling is used to allocate a topic for each word of each document, and allocate a hierarchical topic path for each document;

according to the probability distributions obtained through calculation, establishing a likelihood function of the text set, and maximizing the likelihood function, to obtain a new hierarchical Latent Dirichlet Allocation model hyper-parameter; and after judging that an iteration of solving for a hierarchical Latent Dirichlet Allocation model hyper-parameter has converged, and according to the new hierarchical Latent Dirichlet Allocation model hyper-parameter, calculating and outputting the probability distribution between the document and topic and the probability distribution between the topic and word.

2. The method according to claim 1, before the sending the global initial statistical information to the slave node, the method comprises:

setting a different initial value for each hyper-parameter of the hierarchical Latent Dirichlet Allocation model;

dividing the text set into multiple text subsets, wherein the number of the text subsets is the same as the number of nodes; and allocating one topic path for each document in the text set, allocating one topic for each word in the document, and according to the statistical total number of words in the text set, the total number of words contained in each document, and a word list of the text set, obtaining a document-topic count matrix and a topic-word count matrix.

3. The method according to claim 1, after merging the received local statistical information of each slave node, to obtain the new global statistical information, the method comprises:

judging whether the Gibbs sampling performed by the slave node ends according to the number of times of iteration of the Gibbs sampling or a gradient of the likelihood function.

4. The method according to claim 3, further comprising:

if the Gibbs sampling performed by the slave node does not end, sending the new global statistical information to the slave node.

5. The method according to claim 4, after establishing the likelihood function of the text set, and maximizing the likelihood function, to obtain the new hierarchical Latent Dirichlet Allocation model hyper-parameter, the method comprises:

judging whether an iteration of solving for the hierarchical Latent Dirichlet Allocation model hyper-parameter has converged when the gradient of a likelihood function value of the text set corresponding to the hierarchical Latent Dirichlet Allocation model hyper-parameter is less than a preset gradient threshold.

6. The method according to claim 5, further comprising:

if the iteration of solving for a hierarchical Latent Dirichlet Allocation model hyper-parameter does not converge, sending the slave node the new global statistical information having a hierarchical Latent Dirichlet Allocation model hyper-parameter updated.

7. A data processing method, comprising:

receiving, at a plurality of slave nodes, global initial statistical information sent by a master node, wherein the global initial statistical information comprises: text subset information divided in advance according to a text set, preset initial hyper-parameter information of a hierarchical Latent Dirichlet Allocation model, a pre-established nested Chinese restaurant process prior of the text set, hierarchical topic path information of a document, document-topic count matrix information, and topic-word count matrix information;

according to a hierarchical topic path of each document, reallocating a topic for each word in each document through Gibbs sampling;

according to the nested Chinese restaurant process prior, and an updated document-topic count matrix and topic-word count matrix, reallocating a hierarchical topic path for each document through Gibbs sampling; and sending local statistical information to the master node, wherein the local statistical information comprises: document-topic count matrix information and topic-word count matrix information and hierarchical topic path information of each document which are updated and are of a present slave node.

8. The method according to claim 7, after reallocating a topic for each word in each document through Gibbs sampling, the method comprises:

updating the document-topic count matrix and topic-word count matrix information of each document having the topic reallocated for the word.

9. The method according to claim 8, wherein reallocating a topic for each word in each document through Gibbs sampling comprises:

allocating multiple hierarchical sub-topics for each document in the text subset, and in the multiple hierarchical sub-topics, allocating a corresponding topic for each word in the document through Gibbs sampling.

10. The method according to claim 7, further comprising:

if new global statistical information sent by the the master node is received, reallocating a hierarchical topic path for each document and reallocating a topic for each word in each document, through Gibbs sampling and according to the new global statistical information.

11. A master node configured as a computer accessible to a data network, the master node comprising:

a sending unit, configured to send global initial statistical information over the data network to a plurality of slave nodes, wherein the global initial statistical information comprises: text subset information divided in advance according to a text set, preset initial hyper-parameter information of a hierarchical Latent Dirichlet Allocation model, a pre-established nested Chinese restaurant process prior of the text set, hierarchical topic path information of a document, document-topic count matrix information, and topic-word count matrix information; further configured to, if Gibbs sampling performed by a slave node does not end, send new global statistical information to the slave node; and configured to, if iteration of solving for a hierarchical Latent Dirichlet Allocation model hyper-parameter does not converge, send the slave node the new global statistical information having a hierarchical Latent Dirichlet Allocation model hyper-parameter updated;

a merging unit, configured to merge local statistical information received from the plurality of slave nodes, to obtain new global statistical information, wherein the local statistical information comprises: a document-topic count matrix, a topic-word count matrix and a document hierarchical topic path of each slave node, and the new global statistical information comprises: global text-topic count matrix information, topic-word count matrix information, topic-word count matrix information of each slave node, and a global document hierarchical topic path;

a calculating unit, configured to, after judging that a Gibbs sampling performed by the slave node has ended, calculate a probability distribution between the document and a topic and a probability distribution between the topic and a word according to the new global statistical information; further configured to, according to the probability distributions obtained through calculation, establish a likelihood function of the text set, and maximize the likelihood function to obtain new hierarchical Latent Dirichlet Allocation model hyper-parameter; and configured to, after judging that an iteration of solving for a hierarchical Latent Dirichlet Allocation model hyper-parameter converges, and according to the new hierarchical Latent Dirichlet Allocation model hyper-parameter, calculate and output the probability distribution between the document and topic and the probability distribution between the topic and word.

12. The master node according to claim 11, further comprising:
   a setting unit, configured to set a different initial value for each hyper-parameter of the hierarchical Latent Dirichlet Allocation model;
   a dividing unit, configured to divide the text set into multiple text subsets, wherein the number of the text subsets is the same as the number of nodes;
   an allocating unit, configured to allocate one topic path for each document in the text set, allocate one topic for each word in the document, and according to the statistical total number of words in the text set, the total number of words contained in each document, and a word list of the text set, obtaining a document-topic count matrix and a topic-word count matrix; and
   a judging unit, configured to judge whether the Gibbs sampling performed by the slave node ends according to the number of times of iteration of the Gibbs sampling or a gradient of the likelihood function; further configured to, judge, whether the iteration of solving for a hierarchical Latent Dirichlet Allocation model hyper-parameter converges when a gradient of a likelihood function value of the text set corresponding to the hierarchical Latent Dirichlet Allocation model hyper-parameter is less than a preset gradient threshold.

13. The master node according to claim 12, wherein,
   the sending unit is configured to, if the Gibbs sampling performed by the slave node does not end, send the new global statistical information to the slave node, and if the iteration of solving for a hierarchical Latent Dirichlet Allocation model hyper-parameter does not converge, send the slave node the new global statistical information having a hierarchical Latent Dirichlet Allocation model hyper-parameter updated.

14. A slave node configured as a computer accesible to a data network, the slave node comprising:
   an information receiving unit, configured to receive global initial statistical information sent over the data network by a master node, wherein the global initial statistical information comprises: text subset information divided in advance according to a text set, preset initial hyper-parameter information of a hierarchical Latent Dirichlet Allocation model, a pre-established nested Chinese restaurant process prior of the text set, hierarchical topic path information of a document, document-topic count matrix information, and topic-word count matrix information;
   a topic allocating unit, configured to, according to a hierarchical topic path of each document, reallocate a topic for each word in each document through Gibbs sampling;
   a path allocating unit, configured to, according to the nested Chinese restaurant process prior, and an updated document-topic count matrix and topic-word count matrix, reallocate a hierarchical topic path for each document through Gibbs sampling; and
   an information sending unit, configured to send local statistical information to the master node, wherein the local statistical information comprises: document-topic count matrix information and topic-word count matrix information and hierarchical topic path information of each document which are updated and are of a present slave node.

15. The slave node according to claim 14, further comprising:
   an updating unit, configured to update the document-topic count matrix and topic-word count matrix information of each document having the topic reallocated for the word.

16. The slave node according to claim 15, wherein
   the topic allocating unit is configured to allocate a corresponding topic for each word in the document in the manner of allocating multiple hierarchical sub-topics for each document in the text subset, and in the multiple hierarchical sub-topics, allocating a corresponding topic for each word in the document through Gibbs sampling.

17. The slave node according to claim 14, wherein
   the path allocating unit is further configured to, if new global statistical information sent by the master node is received, reallocate a hierarchical topic path for each document through Gibbs sampling and according to the new global statistical information; and
   the topic allocating unit is further configured to, if the new global statistical information sent by the master node is received, reallocate a topic for each word in each document through Gibbs sampling and according to the new global statistical information.

* * * * *